US008282296B2

(12) United States Patent
Colombi

(10) Patent No.: US 8,282,296 B2
(45) Date of Patent: Oct. 9, 2012

(54) PRINTER AND EXTRACTABLE MODULE THEREFOR

(75) Inventor: Alberto Colombi, Agliè (IT)

(73) Assignee: Telecom Italia S.p.A., Milan (IT)

( * ) Notice: Subject to any disclaimer, the term of this patent is extended or adjusted under 35 U.S.C. 154(b) by 499 days.

(21) Appl. No.: 12/514,931

(22) PCT Filed: Nov. 14, 2006

(86) PCT No.: PCT/EP2006/010883
§ 371 (c)(1),
(2), (4) Date: May 19, 2009

(87) PCT Pub. No.: WO2008/058552
PCT Pub. Date: May 22, 2008

(65) Prior Publication Data

US 2010/0047003 A1 Feb. 25, 2010

(51) Int. Cl.

| | |
|---|---|
| ***B41J 15/00*** | (2006.01) |
| ***B41J 11/00*** | (2006.01) |
| ***B41J 15/16*** | (2006.01) |
| ***G03B 1/04*** | (2006.01) |

(52) U.S. Cl. ........ 400/613; 400/584; 400/586; 400/609; 400/611; 400/614.1; 242/324

(58) Field of Classification Search .................. 400/613, 400/614, 614.1, 584, 586, 609, 611; 242/324; 235/2, 7 R
See application file for complete search history.

(56) References Cited

U.S. PATENT DOCUMENTS 3,743,201 A * 7/1973 Tarantino et al. .......... 242/535.5
6,406,202 B1 * 6/2002 Unno et al. .................. 400/613

FOREIGN PATENT DOCUMENTS

JP 58-128886 A 8/1983
JP H07-301550 A 11/1995
JP 2000048258 A 2/2000
JP 2001-310522 A 11/2001
JP 2003312076 A * 11/2003

OTHER PUBLICATIONS

International Search Report dated Jul. 13, 2007, issued in corresponding International Application No. PCT/EP2006/010883.
Examination Report from related European Application No. 06 829 034.5-1251, dated May 22, 2012.

* cited by examiner

*Primary Examiner* — Michael G Lee
*Assistant Examiner* — Laura Gudorf
(74) *Attorney, Agent, or Firm* — Venable LLP; Robert Kinberg; Steven J. Schwarz

(57) ABSTRACT

A printer and a module for supporting a paper roll therefore, the module comprising: a body for housing the roll; a first supporting member for the roll before that the roll is unwound for the printing operation; a second supporting member for the roll, after the roll has been wound at the end of printing operations; and a first engaging member carried by said body and disposable in a first configuration wherein it is coupled with a second engaging member carried by the printer to secure the module on the printer; the first engaging member is further disposable in a second configuration, wherein it is released from the second engaging member to permit the extraction of the module from the printer.

18 Claims, 5 Drawing Sheets

PRINTER AND EXTRACTABLE MODULE THEREFOR

The present invention relates to a printer and to an extractable module for such a printer.

Businesses are known to employ printers, which print sales receipts intended for customers, and a copy of the same receipts which, for tax reasons, must be stored in a remote location from the printer according to a given procedure.

More specifically, known printers substantially comprise a print head; a first roll (receipt paper roll) housed inside a seat on the printer and on which the print head prints the sales receipts; and a second roll (journal paper roll), also housed inside the seat and on which the print head prints the copy of the sales receipts, hereinafter referred to for the sake of simplicity as the tax copy.

The first roll (typically wound onto an inner support) is mounted on a first shaft located inside the printer seat. During printing operations, the first roll is unwound off the first shaft so that a free end of the roll is positioned along the traverse path of the print head; the print head can therefore print the sales receipt on that free end, which is then torn off the first roll and given to the customer.

Similarly, the second roll (typically wound onto an inner support) is mounted on a second shaft located inside the printer seat. During printing operations, the second roll is unwound off the second shaft, and is rewound onto a third shaft also housed inside the seat. For this purpose, the second roll is fitted idly to the second shaft, and has one end fitted securely inside a slot on the third shaft. During the above operation, the second roll has an unwound intermediate portion, interposed between the second and third shaft, positioned along the traverse path of the print head alongside the free end of the first roll; the print head can therefore print the copy of the sales receipts (tax copy) on that intermediate portion.

The printer head prints on the free end of the first roll and on the intermediate portion of the second roll during the same stroke; in particular, it prints firstly on the first roll paper and then on the second roll paper.

After each traverse of the printing head, the third shaft is rotated to unwind the second roll off the second shaft and wind the second roll onto the third shaft.

When wound completely onto the third shaft, the second roll must be removed from the seat to be stored in a suitable remote location from the printer.

More specifically, the second roll and the third shaft are removed jointly from the seat on the printer, and the second roll is then removed from the third shaft for suitable storage.

Also the second shaft is removed from the seat on the printer, to allow idle fitting thereon of a blank second roll and insertion thereof inside the seat on the printer.

The third shaft is in turn inserted inside the seat on the printer.

At this point, one end of the second roll is drawn off the second shaft and threaded inside the slot on the third shaft to secure the second roll to the third shaft.

The above-described operations of removing and inserting the second roll can cause prolonged hold-ups and hence inconvenience to customers. Demand therefore exists in this particular sector to reduce customer waiting time.

The above operations are also extremely awkward, in that, to reduce overall size, known printers allow very little space between the edge of the seat and the fully-wound second roll on the third shaft.

JP2000048258 A in the name of Fujitzu General LTD relates to a cash register and deals with the problem of replenishment with a journal and a receipt. To exchange the roll paper, a cover is rotated by a rotation mechanism, opened backward, the printed journal is rotated by a rotary shaft and raised upward, a journal roll paper is put on a roll paper holder, its tip is put through a printer and fixed to a journal winding part, a receipt roll paper is put on a roll paper holder and its tip is put through a printer. The journal holder is returned to its original position and the cover is closed.

In the cash register model Euro-2100 of Elcom, paper roll change must be carried out according to the following steps. A control button must be pressed to flip a tape cover open. A paper tape separator is taken out along with empty paper reel cores, which are then removed; new paper tape reels can now be installed. The separator can be inserted with installed tapes into a rear cover. The journal tape is then inserted into the printer, and the printer will load the tape automatically into its mechanism. Then the end of journal tape must be placed into a winding reel, which must be rotated in the winding direction several times. The winding reel must then be placed into the rear cover in such way that it will be highly stretched.

Demand therefore also exists to make removal and insertion of the second roll easier, while limiting the overall size of the printers.

It is an object of the present invention to propose a technique to make easier and faster the replacement of a paper roll from a printer, in particular the replacement of a paper roll adapted to provide tax copies of sales receipts from a printer for point of sales.

The proposed solution lies in the use of a preassembled module housing the paper roll, adapted to be easily inserted in and extracted from a printer seat, and adapted to be easily disassembled for removing the paper roll. Accordingly, the module containing the finished roll can be quickly extracted from the printer, and with the same quickness be replaced with an already prepared module housing a new roll.

The disassembly of the module can be performed in a second time, without resulting in a detrimental waiting time.

According to a first aspect thereof, the present invention therefore refers to a printer comprising a main body and a module associated with the main body for supporting a printable member; the module comprising:

- a housing body;
- a first supporting member associated to the housing body and adapted to support a roll of the printable member before it is unwound for executing a print operation on the printable member, and a second supporting member associated to the housing body and adapted to support said roll once the roll has been wound upon completion of a print operation; and
- at least a first fastening member carried by the housing body and at least a second fastening member carried by the main body; the first and the second fastening member being settable in a first reciprocal position, in which they are coupled to secure the module to the main body, and in a second reciprocal position, in which they are released to permit removal of the module from the main body.

Preferably, the first supporting member is adapted to support idly the roll and the second supporting member is connected releasably to the housing body for being extracted therefrom together with the roll.

The housing body may be open at least at one side to allow the extraction of the roll and the second supporting member from the module.

The housing body may be frame-shaped and may comprise two walls connected releasably to opposite ends of the second supporting member.

Such walls may be adapted to flex apart to permit removal of the roll and the second supporting member.

The first and the second fastening member may be click-on fastening members.

The printer may also comprise an elastic coupling member acting on one of the first and second fastening members for disposing the first fastening member into the first reciprocal position.

The first fastening member may comprise at least one tooth and the second fastening member may comprise at least one projection connectable to the tooth.

The first fastening member may comprise two such teeth angularly integral with each other and the second fastening member may comprise two such projections, each connectable releasably to a respective tooth.

The module may also comprises a pin suitable to rotate with respect to the housing body and angularly integral with the teeth, and an elastic coupling member interposed between the pin and said housing body.

The printer may also comprise a release lever angularly integral with the tooth, and which is operated to move the first fastening member from the first reciprocal position to the second reciprocal position in opposition to the elastic coupling member.

The module may comprise at least a first positioning member connectable to at least a second positioning member carried by the main body, to set the first and second fastening member to a predetermined relative position inside the seat, in which they click onto each other.

The at least a first positioning member and the at least a second positioning member may have conjugate profiles.

The printer may also comprise a wheel angularly integral with one of the first and second supporting members and functionally connectable to a drive member to unwind the roll off the first supporting member and wind the roll onto the second supporting member.

The housing body may carry at least a roller provided to press a portion of the roll against a guiding member during printing of the portion.

The housing body and the roller are elastically connected to each other.

The present invention further relates to a module for supporting a printable member and adapted to be housed in a printer for permitting printing operation on the printable member; characterized in comprising:

a housing body;

a first supporting member associated to the housing body and adapted to support a roll of the printable member before it is unwound to execute the printing operations, and a second supporting member associated to the body and adapted to support the roll once it has been wound at the end of printing operations; and at least a first fastening member carried by the body and adapted to couple releasably with a second fastening member carried by the printer to permit a fixed mounting of the module into the printer and extraction of the module from the printer.

A preferred, non-limiting embodiment of the present invention will be described by way of example with reference to the accompanying drawings, in which.

Figure 1:
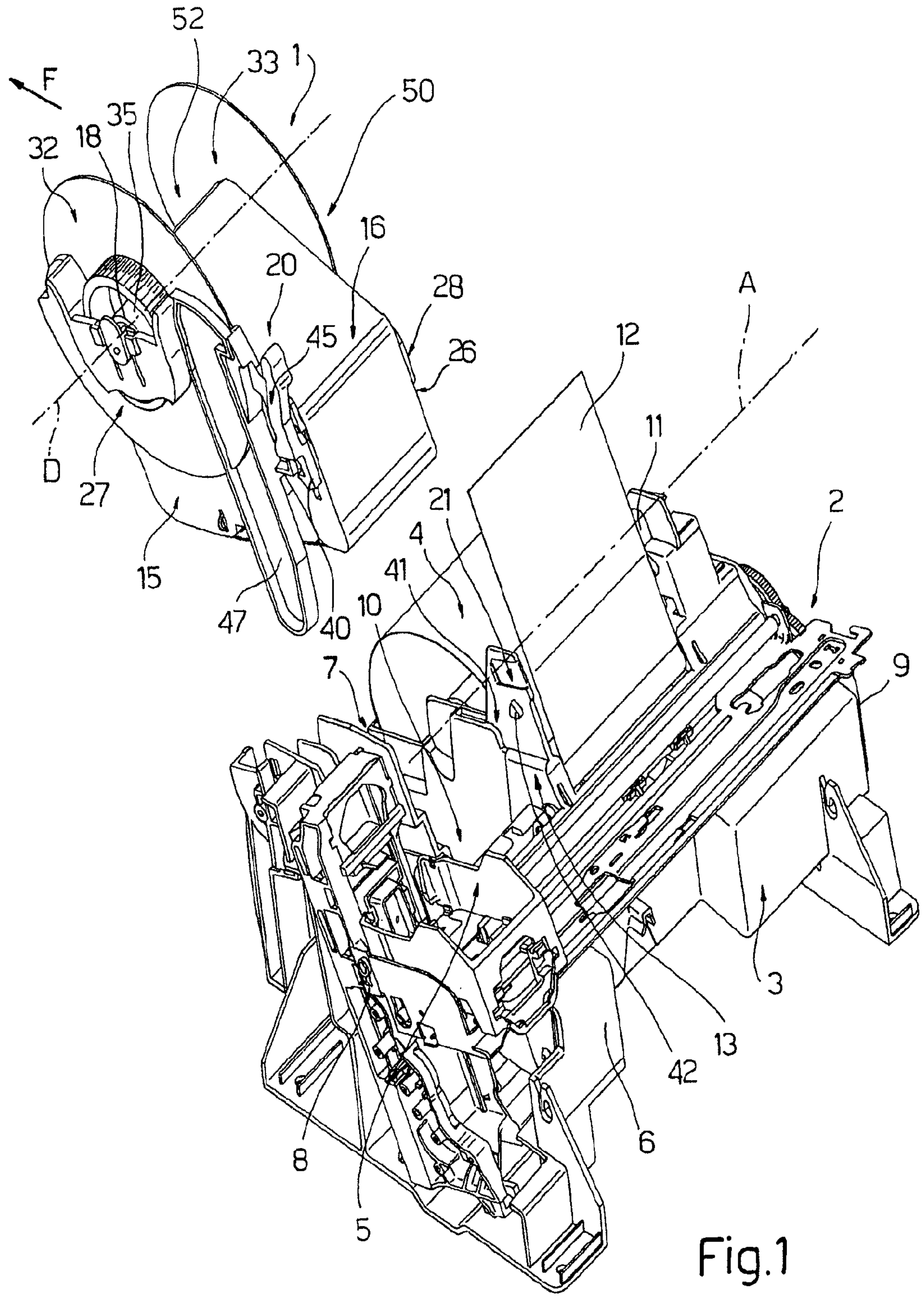
FIG. 1 shows a view in perspective of a preassembled module in accordance with the present invention, and of a printer in which to insert the preassembled module.

Number 2 in FIG. 1 indicates a printer 2 suitable to print on a first roll 4 (of printable material, preferably paper) sales receipts indicating the amount received for given articles and intended for the purchasers of said articles, and also to print on a second roll 16 (of printable material, preferably paper) a copy of such sales receipt (tax copy), which for tax reasons must be stored in a remote location from printer 2.

More specifically, printer 2 comprises a frame 3, defining a main body of the printer and made of a plurality of parts, and a print head (not shown in the attached figures) mounted on a carrier 5, which moves inside the frame 3.

Frame 3 comprises a front and a rear portion 6, 7 and two side panels 8, 9, and is designed to house the first roll 4 and the second roll 16. The first roll 4 is housed in a first seat 13 of the frame 3 and it is supported so that it can rotate about an axis A. More in detail, roll 4 is mounted for rotation on a shaft 11 driven by a motor (not shown) to unwind roll 4 off shaft 11.

The carrier 5 provided with the print head is movable along a direction parallel and offset with respect to axis A to print the paper of roll 4, so generating the sales receipts.

In particular, frame 3 defines inwardly a path (not shown) for the paper unwound from the roll 4 such that an end portion 12 thereof can be positioned along the traverse path of the printer head, to permit printing of the sales receipt thereon.

The printer 2 comprises an extractable module 1 suitable to house the second roll 16. Frame 3 comprises a second seat 10 lateral to the first seat 13 and provided for housing module 1.

Module 1 (FIGS. 1 to 4 and FIG. 6) comprises a body 50 housing and supporting the roll 16. As shown in detail in FIG. 2, body 50 comprises a frame 15, a re-winding spool 52 and a member 20 adapted to connect module 1 and printer 2 one another.

Member 20 defines a first fastening element, which can be set to a first configuration (coupling configuration) wherein it is engaged with a second fastening element 21 (FIGS. 1, 3, 4) on printer 2 to secure module 1 onto the printer 2, and to a second configuration (release configuration) wherein it is disengaged from the second fastening element 21 to permit removal of module 1 from printer 2.

Therefore, when the module 1 is housed into the seat 10, the cooperation between the first fastening element 20 and the second fastening element 21 secures it inside the seat 10.

The frame 15 supports a shaft 17 (visible only in FIG. 2) extending along an axis C, for supporting the second paper roll 16 to be subjected to print operations. Furthermore, frame 15 is adapted to support the spool 52 in a rotary manner about an axis D extending parallel to the axis C, so that spool 52 can receive the paper subjected to print and rewind the paper roll 16. Therefore, roll 16 is designed to be supported by shaft 17 and to be progressively unwound from shaft 17 and wound on shaft 18.

When module 1 is inserted inside seat 10, axes C and D are parallel to axis A.

Figure 2:
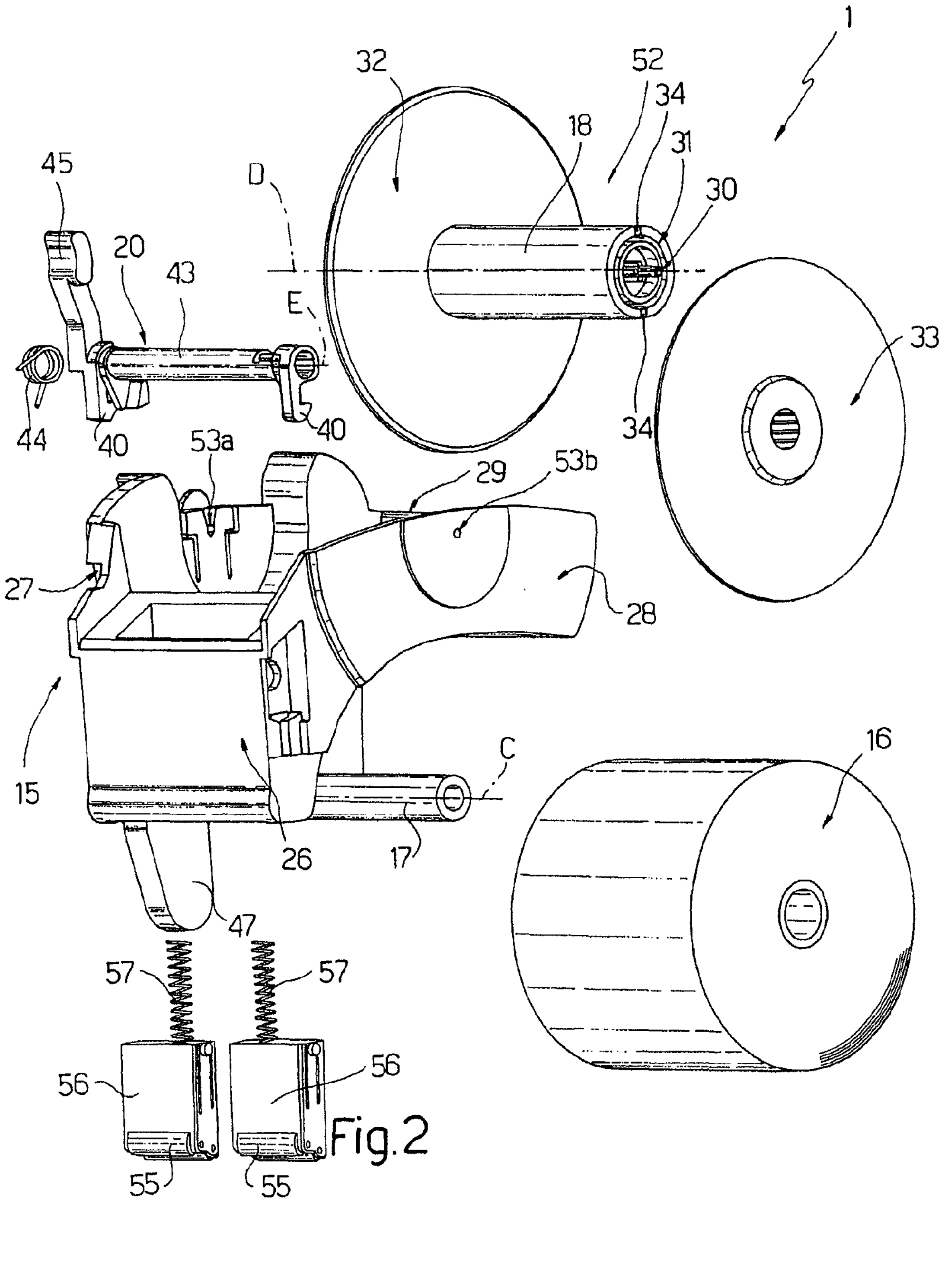
FIG. 2 shows an exploded view in perspective of the preassembled module in FIG. 1.
Figure 4:
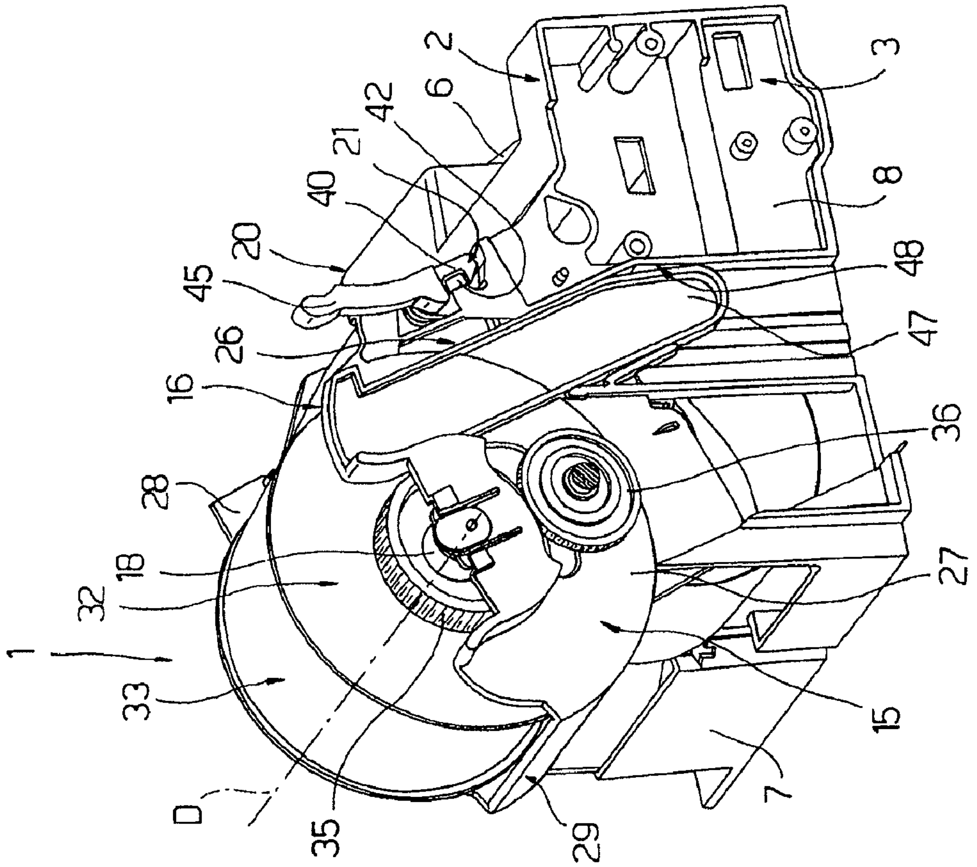
FIGS. 3 and 4 show two larger-scale views in perspective, from different angles and with parts removed for clarity, of the preassembled module and printer in FIG. 1.
Figure 3:
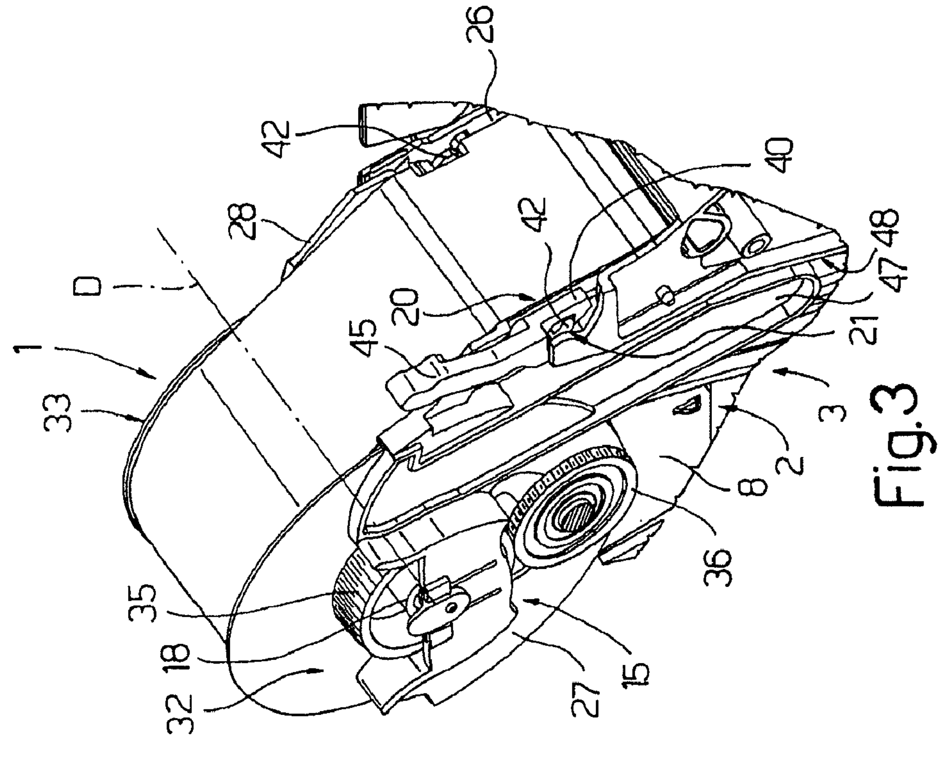

With reference to FIG. 2, spool 52 comprises a shaft 18 to be located along axis D and a couple of circularly-shaped flanges 32, 33, which are coupled to the shaft 18 at opposite ends thereof. Preferably, flange 32 is integral with the shaft 18 whilst the flange 33 is releasable from shaft 18.

Frame 15 comprises, on opposite sides, a wall 27 perpendicular to axes C and D, and an arc-shaped wall 28 parallel to wall 27.

Frame 15 also comprises a wall 26 defining a sliding surface for a portion of roll 16 during unwinding off shaft 17 and winding onto shaft 18.

More precisely, wall 26 extends between walls 27, 28, and is perpendicular to walls 27, 28 and parallel to axes C, D.

Wall 26 is on the front portion of the module 1 when the module 1 is mounted on the printer 2, and the surface of wall 26 on which the portion of roll 16 unwound off shaft 17 and to be wound onto shaft 18 slides is a front surface of wall 26. Shafts 17 and 18 are on the opposite side of wall 26 with respect to the above-mentioned surface of wall 26.

Frame 15 finally comprises a wall 29 extending between walls 27 and 28, on the opposite side to wall 26, i.e. on the rear portion of the module 1 when the module 1 is mounted on the printer 2.

Frame 15 defines a space extending between the walls 27, 28 and provided to house the spool 52 and the roll 16 (initially held by shaft 17); this space is open at its opposite ends adjacent to shafts 17 and 18, to maximise the size of the roll 16 that can be unwound off shaft 17 and wound onto shaft 18, and to permit removal of roll 16 from frame 15 once it is wound fully onto shaft 18.

Shaft 17 (FIG. 2) projects from wall 27, is hollow, and houses a spring (not shown) for keeping shaft 17 pressed against roll 16 and preventing accidental, spontaneous unwinding of roll 16.

In use, roll 16 is fitted idly onto shaft 17 and the free end of roll 16 is coupled with shaft 18 so that the rotation of shaft 18 about axis D winds roll 16 onto shaft 18. More particularly, shaft 18 has one or more slots 34, two in the shown embodiment, engageable by the end of roll 16. Once wound fully onto shaft 18, the roll 16 is detached completely from shaft 17.

Each of the opposite axial ends of shaft 18 (only one shown in FIG. 2) comprises a coupling member in the form of a lance 30 extending along axis D. Lances 30 project through flanges 32, 33 and are designed to be housed releasably inside respective seats 53*a*, 53*b* formed in walls 27, 28.

Walls 27, 28 have a certain flexibility and can be flexed apart to release lances 30 from the respective seats 53*a*, 53*b*.

Flange 32 is fitted laterally, on the opposite side to flange 33, with a gear 35 (shown in FIGS. 1, 3, 4, 5 and 7) which rotates about axis D and meshes with a gear 36 (shown in FIGS. 3, 4, 6 and 7) fitted to printer 2.

More specifically, gear 36 is housed (when the module 1 is housed inside the printer 2) inside seat 10 and rotated, parallel to axes C and D and synchronously with rotation of shaft 11 about axis A, by a mechanism not shown.

Spool 52 can therefore be rotated with respect to axis D to unwind roll 16 off shaft 17 and synchronously wind roll 16 onto shaft 18.

Once module 1 is fixed inside seat 10 by the first and second fastening element 20, 21, the portion of roll 16 sliding along wall 26 is located alongside portion 12 of roll 4, along the traverse path of the print head.

The first fastening element 20 comprise two teeth 40 (FIGS. 1 to 4 and FIG. 6), and the second fastening element 21 comprise two projections 42 (FIGS. 1, 3, 4) projecting inside seat 10 and each of which clicks onto a respective tooth 40. In particular, as shown in FIG. 1, one projection 42 protrudes from a wall 41 delimiting laterally the seat 10 and the other projection (not visible) protrudes from an opposite wall.

Figure 6:
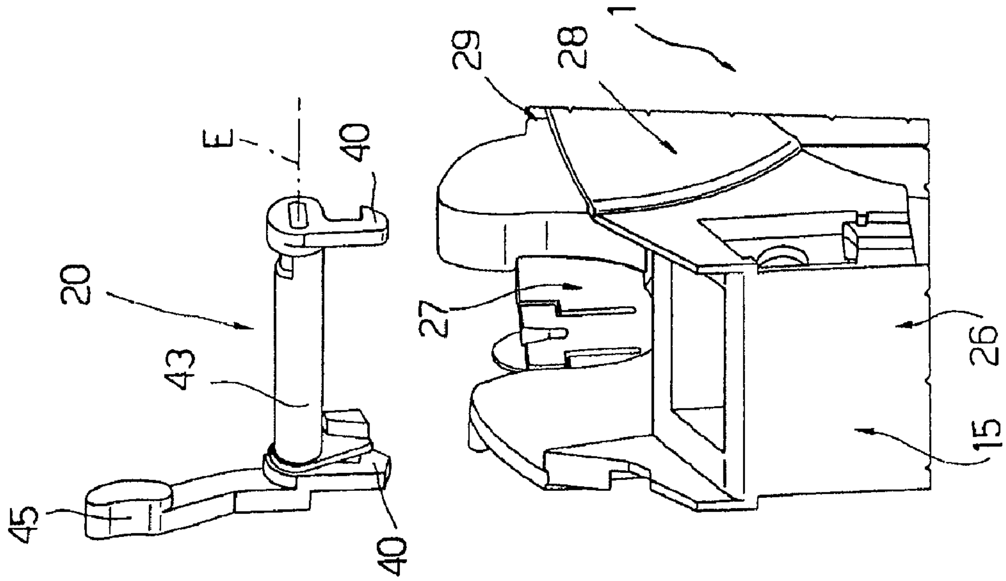
FIG. 6 shows a view in perspective of further details of FIG. 1.
Figure 5:
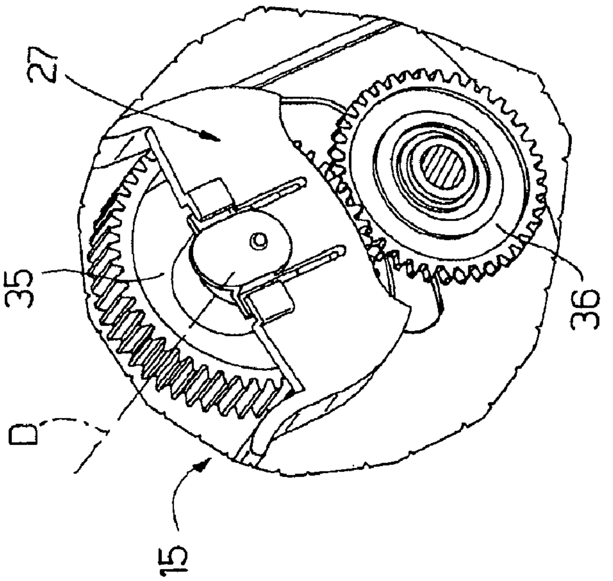
FIG. 5 shows a much larger-scale view in perspective of a detail of FIGS. 3 and 4.
Figure 7:
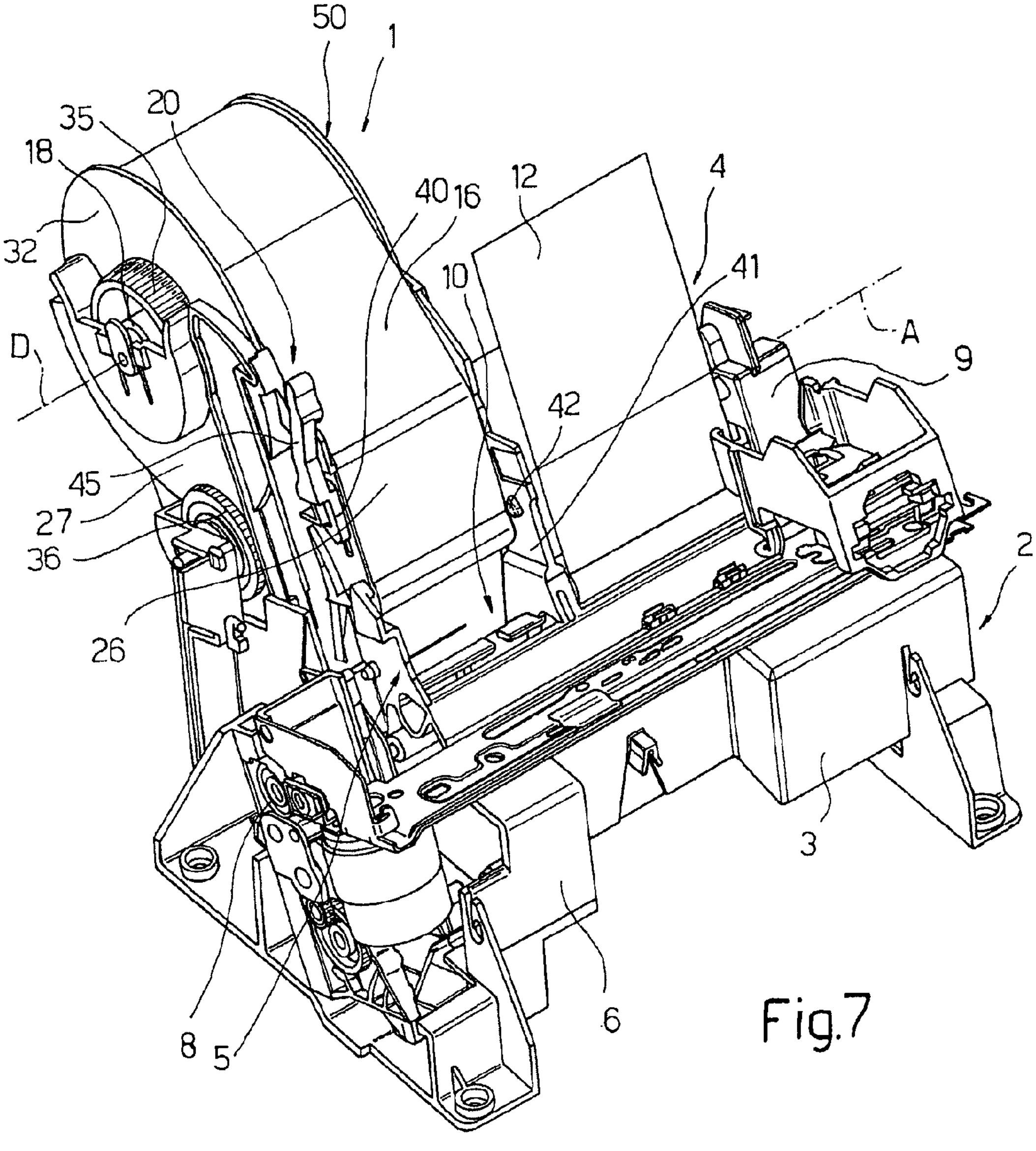
FIG. 7 shows a view in perspective of the preassembled module and the printer of FIG. 1 during an extraction step.

With particular reference to FIGS. 2 and 6, teeth 40 extend from opposite axial ends of a pin 43 housed behind wall 26 and rotating about an axis E parallel to axes C, D. More specifically, teeth 40 project from pin 43 towards shaft 17.

Teeth 40 are loaded by a spring 44 (FIG. 2) into an angular position in which they click onto projections 42 to retain module 1 inside seat 10 on printer 2. Spring 44 is a coil spring wound onto pin 43 and fixed at opposite ends to wall 26 and pin 43.

First fastening element 20 also comprises an operating lever 45 extending integrally from one of teeth 40. When operated manually, lever 45 rotates teeth 40 and pin 43 integrally, in opposition to spring 44, to release teeth 40 from projections 42 and so release module 1 from seat 10 on printer 2.

It is clear that the coupling/release mechanism could comprise an operating member (equivalent to the lever 45) and an elastic member (equivalent to the spring 44) both carried by frame 3 of printer 2.

Frame 15 also comprises a positioning member 47 (FIGS. 1 to 4), which is fitted integrally to wall 27, is elongated in shape in a direction perpendicular to axis D and parallel to wall 27 (in a downward direction when module 1 is fitted in seat 10).

Member 47 is fittable inside a further positioning member 48 on the side panel 8 of printer 2 (FIGS. 3 and 4), having a conjugate profile with respect to member 47, in particular defining a groove wherein the member 47 can slide. The profiles are designed so that the member 47 can slide down to an end position in which teeth 40 click onto projections 42.

Members 47 and 48 thus simplify insertion of module 1 inside seat 10 into the position in which teeth 40 click onto projections 42.

Module 1 further comprises a number of a paper contrast roller 55 (shown only in FIG. 2), in the shown embodiment in number of two.

Each roller 55 is mounted on a relative pad 56 in a rotary way about an axis parallel to axes C, D, E.

Pads 56 and frame 15 are connected each other by helically-shaped springs 57, which load pads 56 and rollers 55 against the portion of roll 16 unwounding from shaft 17 and to be subjected to print.

In particular, rollers 55 press said portion of the roll 16 against guiding rollers (not shown) of the printer, so maintaining such portion in the required position and allowing a correct execution of the printing operations.

In particular, the pressure exerted by rollers 55 avoids that, during the printing of two consecutive lines on the portion of the roll 16, said portion bends and loses its alignment with the printer head.

Operation of module 1 will be described as of the operating configuration in which module 1 is inserted inside seat 10 on printer 2.

More specifically, module 1 is housed inside seat 10 so that the portion of roll 16 sliding along wall 26 is located alongside portion 12 of roll 4 and facing the print head.

In this configuration, teeth 40 are clicked onto projections 42 to retain module 1 inside seat 10.

Carrier 5 with printer head moves parallel to axis A so allowing first the roll 4 end portion 12, then the sliding portion of roll 16, to be printed, so as to obtain the sales receipt and copy thereof.

Once printed, the sales receipt is torn off and handed to the customer, and shaft 11 is rotated by the relative motor (not shown) to position a blank end portion 12 facing print head.

At the same time, gears 36, 35 are rotated to rotate spool 52 about axis D. The rotation direction of spool 52 is such as to unwind roll 16 off shaft 17 and wind roll 16 onto shaft 18. A blank portion of roll 16 thus slides along wall 26 into a position facing the print head. By the time roll 16 terminates its function (i.e., it has been completely printed), it is wound completely onto shaft 18.

To preserve the tax copy, module 1 must be removed (FIG. 7) from seat 10, and then, when module 1 is located outside of the printer 2, the roll 16 can be removed from body 15.

More specifically, using lever 45, pin 43 and teeth 40 are rotated in opposition to spring 44. In particular, teeth 40 are rotated into an angular position releasing projections 42 and permitting removal of module 1 from seat 10.

A second module 1, assembled beforehand and containing a blank roll 16 held by its shaft 17, is fixed inside seat 10 on printer 2. More precisely, the second module 1 is inserted by feeding member 47 into groove defined by member 48 into a position in which teeth 40 click onto projections 42.

At this point, print head can resume operation, printing the sales receipts on roll 4 and the tax copy on roll 16.

Roll 16, on which the tax copy is printed, can be easily removed from the extracted module 1; typically the finished roll 16, held by spool 52, is removed from the extracted module 1 after that new module 1 has been inserted into printer 2 and in a remote location from printer 2. To remove roll 16, walls 27, 28 are flexed apart so as to release lances 30 from the respective seats 53*a*, 53*b* in walls 27, 28.

Spool 52 and roll 16 are then removed integrally from body 15 in an extraction direction F (FIG. 1) perpendicular to axis C and parallel to walls 27, 28.

At this point, flange 33 is removed from shaft 18 and roll 16 is detached from shaft 18 and stored in the tax copy store.

Finally, the module 1 can be re-assembled with a blank roll 16 and made available at printer 2.

First of all, the spool 52 is re-assembled (by coupling flange 33 and shaft 18 each other) and coupled again with frame 15 (by housing lances 30 inside the respective seats 53*a*, 53*b* of the walls 27, 28).

The blank roll 16 is fitted idly onto shaft 17, and an end portion of roll 16 is run along wall 26 and securely fitted inside the slot 34 on shaft 18. Shaft 18 is then rotated a few turns about axis D to secure the paper of roll 16 firmly to shaft 18.

The module 1 so formed can is ready to be inserted, when required, inside seat 10 on printer 2.

The advantages of printer 2 according to the present invention will be clear from the foregoing description.

In particular, with respect to the known solutions described in the introductory portion of the present description, the use of module 1 allows to reduce the number of operations which are necessary to change roll 16, so minimizing the length of time customers are kept waiting.

In fact, customers have to wait only for the time necessary to remove module 1 from seat 10 and to insert into seat 10 the second module 1 provided with a blank roll 16, whilst the operation of removing from removed module 1 the roll 16 on which the tax copy is printed may be performed when the second module 1 is already inserted into printer 2, for instance in a moment in which there is no customers waiting.

Moreover, the operation of removing roll 16 with the tax copy and inserting the blank roll 16 are simplified greatly by being performed outside seat 10 of printer 2.

Finally, the overall size of printer 2 is reduced as provision of spaces for inserting fingers of the operator between seat 10 and roll 16 to perform the above-mentioned operations is not necessary.

Clearly, changes may be made to preassembled module 1 and printer 2 as described and illustrated herein without, however, departing from the scope defined in the accompanying claims.

The invention claimed is:

1. A printer, comprising a main body and a module associated with the main body for supporting a printable member, said module comprising:

a printable member housing body;

a first supporting member associated to said housing body and adapted to support a roll of said printable member before it is unwound for the execution of a print operation on said printable member, and a second supporting member associated to said housing body and adapted to support said roll once the roll has been wound upon completion of the print operation; and at least a first fastening member carried by said housing body and at least a second fastening member carried by said main body; said first and second fastening member being settable in a first reciprocal position, in which the first and second fastening members are coupled to each other to secure said module to said main body, and in a second reciprocal position, in which the first and second fastening members are released from each other to permit removal of said module from said main body, wherein said first fastening member comprises two teeth angularly integral with each other, and said second fastening member comprises two projections, each connectable releasably to a respective tooth;

wherein said module comprises a pin adapted to rotate with respect to said housing body and angularly integral with said teeth, and an elastic coupling member interposed between said pin and said housing body.

2. A printer as claimed in claim 1, wherein said first supporting member is adapted to support idly said roll; and said second supporting member is connected releasably to said housing body for being extracted therefrom together with said roll.

3. A printer as claimed in claim 2, wherein said housing body is open at least at one side to allow the extraction of said roll and said second supporting member from said module.

4. A printer as claimed in claim 3, wherein said housing body is frame-shaped and comprises two walls connected releasably to opposite ends of said second supporting member.

5. A printer as claimed in claim 4, wherein said walls are adapted to flex apart to permit removal of said roll and said second supporting member.

6. A printer as claimed in claim 1, wherein said first and second fastening member are click-on fastening members.

7. A printer as claimed in claim 1, further comprising an elastic coupling member acting on one of said first and second fastening member for disposing said first fastening member into said first reciprocal position.

8. A printer as claimed in claim 1, further comprising a release lever angularly integral with said tooth, and which is operated to move said first fastening member from said first reciprocal position to said second reciprocal position in opposition to said elastic coupling member.

9. A printer as claimed in claim 1, wherein said module comprises at least a first positioning member connectable to at least a second positioning member carried by the main body, to set said first and second fastening member to a predetermined relative position inside the seat, in which the first and second fastening members click onto each other.

10. A printer as claimed in claim 9, wherein said at least a first positioning member and said at least a second positioning member have conjugate profiles.

11. A printer as claimed in 1, further comprising a wheel angularly integral with one of said first and second supporting member and functionally connectable to a drive member to unwind said roll off said first supporting member and wind said roll onto said second supporting member.

12. A printer as claimed in claim 1, wherein said housing body carries at least a roller provided to press a portion of said roll against a guiding member during printing of said portion.

13. A printer as claimed in claim 12, wherein said housing body and said roller are elastically connected to each other.

14. A module for supporting a printable member and adapted to be housed in a printer for permitting a printing operation on said printable member, comprising:

a printable member housing body;

a first supporting member associated to said housing body and adapted to support a roll of said printable member before it is unwound to the execution of the printing operation, and a second supporting member associated to said housing body and adapted to support said roll once it has been wound upon completion of the printing operation; and at least a first fastening member carried by said housing body and adapted to couple releasably with a second fastening member carried by said printer to permit a fixed mounting of said module into said printer and extraction of said module from said printer, wherein said first fastening member comprises two teeth angularly integral with each other, and said second fastening member comprises two projections, each connectable releasably to a respective tooth;

said module further comprising a pin adapted to rotate with respect to said housing body and angularly integral with said teeth, and an elastic coupling member interposed between said pin and said housing body.

15. A printer, comprising a main body and a module associated with the main body for supporting a printable member, said module comprising:

a printable member housing body;

a first supporting member associated to said housing body, extending along a first axis and adapted to support a roll of said printable member before it is unwound for the execution of a print operation on said printable member, and a second supporting member associated to said housing body, extending along a second axis parallel to said first axis and adapted to support said roll once the roll has been wound upon completion of the print operation; and at least a first fastening member carried by said housing body and at least a second fastening member carried by said main body, said first and second fastening member being settable in a first reciprocal position, in which the first and second fastening members are coupled to each other to secure said module to said main body, and in a second reciprocal position, in which the fastening members are released from each other to permit removal of said module from said main body;

wherein:

said module is shaped so as to be inserted into/removed from said main body along an insertion/removal direction orthogonal to said first and second axis; and said fastening members when set in said first reciprocal position are shaped so as to avoid any movement in the insertion/removal direction.

16. The printer as claimed in claim 15, wherein said first and second fastening member are click-on fastening members.

17. The printer according to claim 15, wherein:

said first fastening member comprises at least one tooth, and said second fastening member comprises at least one projection connectable to said tooth;

said module further comprises a pin adapted to rotate with respect to said housing body and is angularly integral with said at least one tooth, and an elastic coupling member interposed between said pin and said housing body.

18. The printer according to claim 16, wherein:

said first fastening member comprises at least one tooth, and said second fastening member comprises at least one projection connectable to said tooth;

said module further comprises a pin adapted to rotate with respect to said housing body and is angularly integral with said at least one tooth, and an elastic coupling member interposed between said pin and said housing body.

* * * * *